Patented Feb. 3, 1925.

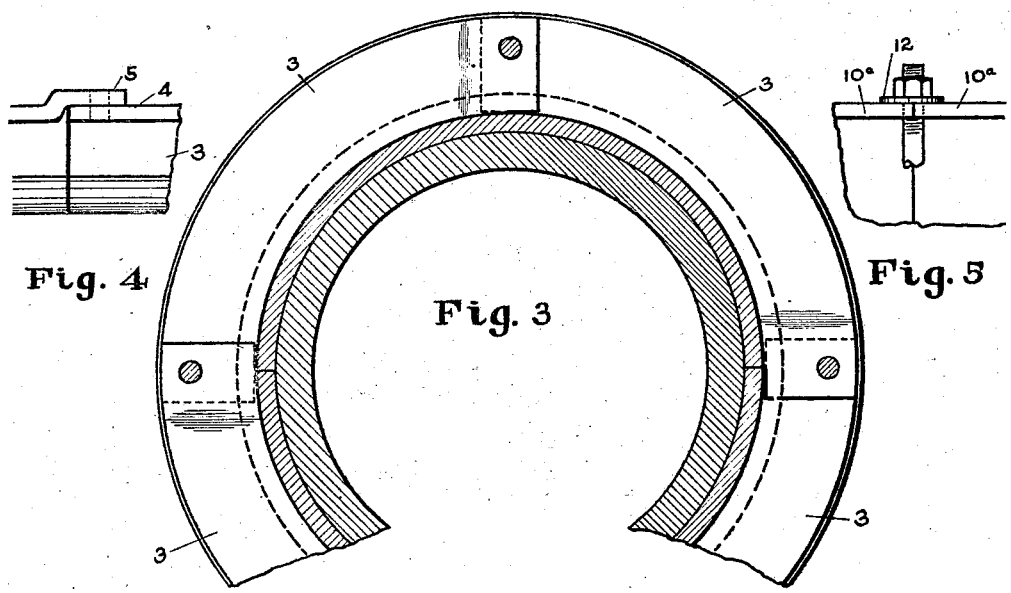
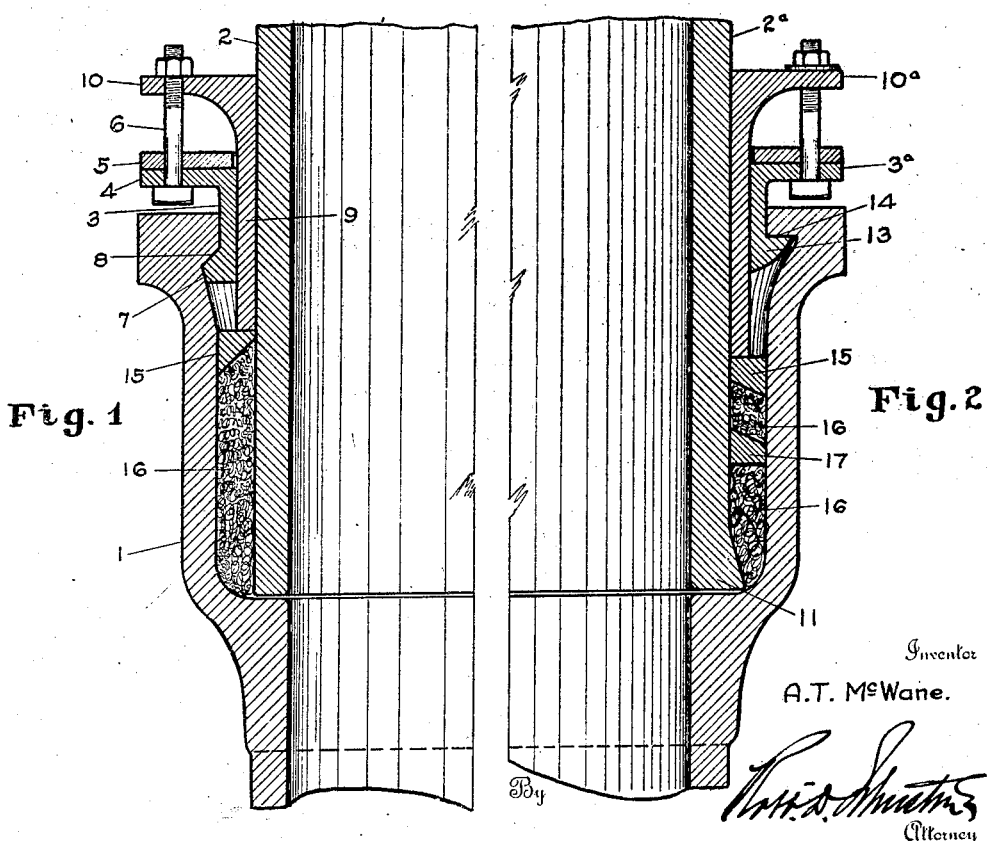

1,525,101

UNITED STATES PATENT OFFICE.

ARTHUR T. McWANE, OF BIRMINGHAM, ALABAMA.

CAST-IRON BELL AND SPIGOT PIPE JOINT.

Application filed February 20, 1922. Serial No. 538,124.

*To all whom it may concern:*

Be it known that I, ARTHUR T. MCWANE, a citizen of the United States of America, residing at Birmingham, in the county of Jefferson and State of Alabama, have invented certain new and useful Improvements in Cast-Iron Bell and Spigot Pipe Joints, of which the following is a specification.

My invention relates to a new and improved means for the packing of the joints of bell and spigot cast iron pipe.

It is the object of my invention to obtain an anchorage for the bolts or equivalent means utilized to force the gland into the joint in the simplest and most inexpensive manner and without changing the present standard design of the bell and spigot pipe.

My invention is more particularly adapted to the pipe having in the bell an annular groove as I propose to make use of this groove to receive the anchorage means which is preferably intended to be introduced into the bell and caused to engage in the groove before the gland is inserted. As the gland is designed, when in position, to hold these anchorage means interlocked with the bell, it follows that a positive and permanent anchorage is provided which can be assembled or removed at will when it is desired to make or to open the joint. By such means I avoid the objection of casting lugs or other special anchorage elements on the bell.

In its preferred embodiments, my invention is illustrated in the accompanying drawings, wherein:—

Fig. 1 is a fragmental cross section showing the adaptation of my invention to one type of pipe joint.

Fig. 2 is a similar view showing my invention adapted to a different type of joint, with a special groove in the bell.

Fig. 3 is a partial cross-sectional view of the joint taken on the plane 3—3 of Fig. 1.

Fig. 4 is a detailed elevation of the anchor ring lap joint, while

Fig. 5 is a detailed elevation of the butt joint of the sectional gland.

Similar reference numerals refer to similar parts throughout the drawings.

According to my invention as illustrated in Fig. 1, I show in cross-sectional elevation the standard bell end 1 of a pipe having introduced therein a plain spigot end 2 of the adjoining pipe. I illustrate my anchorage means in the form of a sectional anchor ring 3, each section having an outturned top marginal flange 4 which at one end 5 is raised and overhangs so that it will lap over the main flange 4 of the adjoining ring section. Suitable bolt holes are provided in the lapped flange sections to receive at each joint a connecting bolt 6, which bolts have their heads interposed under the flanges and their threaded ends projecting outwardly from the joint so as to receive the nuts which engage the gland. The anchor ring is illustrated as formed in four sections which are separable to permit of the insertion of the ring into the bell. Each ring section is provided at its inner end with an offset lug or shoulder 7 which is shaped so as to be received in the groove 8 which is normally formed in the bell. The diameter of the assembled anchor ring is such as to cause it to fit against the outer end of the bell and to interlock in the groove 8, leaving a clearance between its inner surface and the spigot 2 sufficient for the introduction of the gland 9. Where the spigot is without a bead the gland can be in the form of a solid ring having about its top an out-turned flange 10 through which the anchor bolts 6 pass and receive the nuts by which the gland can be forced into the joint. Where the spigot end is provided with a bead 11 (Fig. 2) it is necessary to divide the gland 9 into half sections as indicated in Fig. 5. The abutting ends of the flange sections 10ª will be formed with half circular openings to receive the bolts 6. I introduce under each nut in this case a large washer 12.

In Fig. 2 I show a special design of the groove in the bell. Here the groove 13 is provided with a right angled face adapted to be engaged by the right angled hook lug or shoulder 14 on the anchor ring. Otherwise the method of assembling and connecting together the gland and anchor ring is the same in Fig. 2 as in Fig. 1.

In Fig. 1 I show one type of packing having an outer metallic ring 15 engaged by the gland and adapted to force any suitable yielding packing 16 into the space left between the spigot and bell.

In Fig. 2 I show a second metallic packing ring 17 interposed in the yielding packing 16, but it is to be understood that any well known type of packing for the joint may be utilized.

In operation, the packing is applied to the spigot 2 and the same is inserted into the bell 1. The anchor ring is then inserted between the spigot and bell and its sections assembled with the anchor lug 7 or 13 interlocked with the groove 8 or 14 in the bell. The gland is then slid down the spigot into the joint with its bolt holes in position to receive the anchor bolt 6. The nuts on these bolts are then tightened up and the gland is then forced into the joint compressing the packing in the manner well understood to make a tight joint. As heretofore stated the anchor means for carrying the bolts 6 may be in the form of a sectional ring, as shown, or may have any other shape which will interlock with the bell groove and permit the gland to be introduced and to hold the anchorage means interlocked with the bell.

Though I have described with great particularity the details of the embodiment of the invention herein shown, it is not to be construed that I am limited thereto as changes in arrangement and substitution of equivalents may be made by those skilled in the art without departing from the invention as defined in the appended claims.

Having thus described my invention, what I claim as new and desire to secure by Letters Patent, is:—

1. In a joint for bell and spigot pipe wherein the bell has an annular internal groove, anchorage elements having external shoulders adapted to interlock with the internal bell groove and having body portions projecting beyond the bell and adapted to receive bolts, a gland adapted to be inserted between the anchorage elements and the spigot and to hold said anchorage elements interlocked with the bell groove, and bolts connecting said anchorage elements and gland.

2. In a joint for bell and spigot pipe in which the bell has an annular internal groove, an anchorage means comprising a sectional ring having an external shoulder adapted to fit into said groove and having an external flange adapted to overhang the end of the bell, a gland adapted to be inserted through the clearance between the anchorage ring and the spigot and having an outer flange, and bolts connecting the gland and ring flanges, substantially as described.

In testimony whereof I affix my signature.

ARTHUR T. McWANE.

Witness:
   NOMIE WELSH.